May 30, 1944.  C. S. CODY  2,349,845
REFRIGERATING APPARATUS
Filed Feb. 5, 1942  2 Sheets-Sheet 1

INVENTOR
CLIFFORD S. CODY
BY
ATTORNEY

May 30, 1944.  C. S. CODY  2,349,845
REFRIGERATING APPARATUS
Filed Feb. 5, 1942   2 Sheets—Sheet 2

WITNESSES:
R. J. Eisinger
E. H. Lutz

INVENTOR
CLIFFORD S. CODY
BY
ATTORNEY

Patented May 30, 1944

2,349,845

UNITED STATES PATENT OFFICE 2,349,845

REFRIGERATING APPARATUS

Clifford S. Cody, Springfield, Mass., assignor to Westinghouse Electric & Manufacturing Company, East Pittsburgh, Pa., a corporation of Pennsylvania Application February 5, 1942, Serial No. 429,631

3 Claims. (Cl. 230—58)

My invention relates to refrigerating apparatus, more particularly to a motor-compressor unit therefor which is enclosed in a fluid-tight casing and which is resiliently mounted therein, and it has for an object to provide an improved form of resilient mounting.

Another object of the invention is to provide an improved method of resiliently mounting the motor-compressor unit in the casing.

These and other objects are effected by my invention as will be apparent from the following description and claims taken in connection with the accompanying drawings, forming a part of this application, in which:

Figure 1:
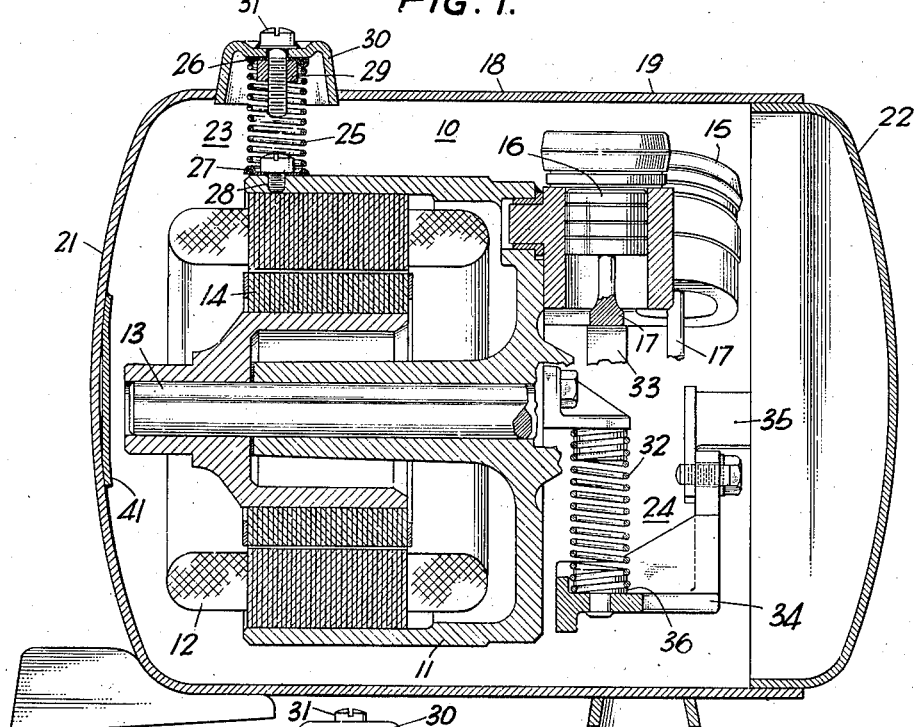
Fig. 1 is a longitudinal vertical section of a motor-compressor unit mounted in accordance with my invention.
Figure 2:
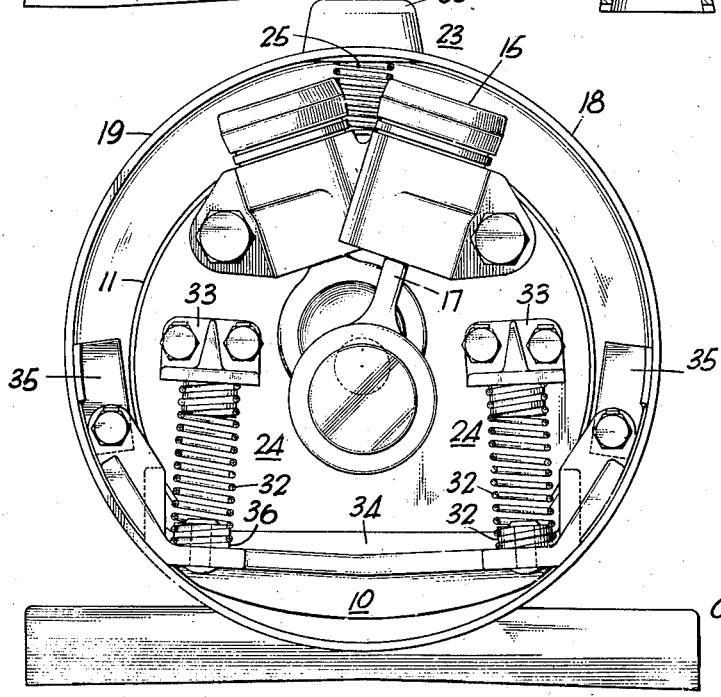
Fig. 2 is an end view of the unit with the end closure of the casing removed.
Figure 3:
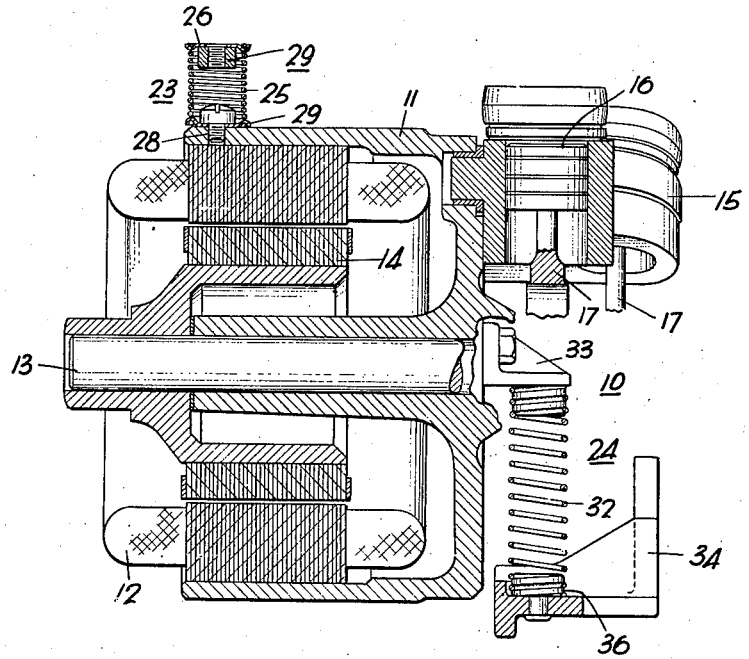
Fig. 3 is a vertical section of the unit removed from the casing.

Referring to the drawings in detail, I show a horizontal-shaft motor-compressor unit 10 including a motor frame 11, a stator 12 mounted therein, a shaft 13, a rotor 14 mounted on the shaft, a cylinder block 15 fastened to the motor frame 11, pistons 16 and connecting rods 17 driven by crank portions (not shown) of the shaft 13. The unit so far described may be of conventional form and further description thereof is unnecessary.

A fluid-tight casing 18 includes a main tubular member which is closed at one end by an end wall 21 and which is open at the other end. The casing further includes a closure member 22 for closing the open end of the tubular member 19.

For resiliently mounting the unit 10, I provide a spring mounting structure which includes a spring assembly 23 at the motor end of the unit and a spring assembly 24 at the compressor end. The spring assembly 23 comprises a tension spring 25, spring holders 26 and 27 secured to the upper and lower ends of the spring 25, and a screw 28 extending through and fastened in the lower spring holder 27. The upper spring holder 26 includes a bushing 29 secured to the underside thereof and having a screw threaded opening registering with an opening in the holder 26. A dome-shaped or inverted cup-shaped member 30 is secured in an opening on the top of the casing member 19, as by soldering or brazing, and extends upwardly therefrom. In the final assembled structure, a screw 31 extends through an opening in the member 30 and is screw threaded into the opening in the bushing 29.

The spring assembly 24 at the compressor end comprises two compression springs 32 disposed on opposite sides of the unit. The upper ends of the springs 32 are threaded onto or otherwise secured to brackets 33 which are bolted to the end wall of the motor frame 11. The lower ends of the springs 32 are secured, as by means of spring nuts 36, to a bracket 34 which extends crosswise of the unit at the bottom thereof. The bracket 34 is preferably of the form which is clearly illustrated on the drawing. The opposite ends of the bracket 34 are bolted to brackets 35 which are fastened to the casing member 19 as by spot welding.

Suitable bumper means are provided to receive the impact of the unit upon excessive movement, as during shipment. One such bumper is shown at 41. Sufficient clearances are provided to prevent contact in normal operation. My invention is not dependent on any particular form of bumper means.

It will also be understood that a flexible loop or other flexible connection is provided in any conduit, usually the discharge conduit, extending between the compressor and the casing.

Method of assembling

The spring assembly 23 is first assembled. The screw 28 is screw threaded into the spring holder 27 and fixed therein as by soldering. The spring holders 26 and 27 are attached to the spring as by threading the end of the spring through an opening in the spring holder. The spring assembly 23 is then fastened to the motor-compressor unit by screw threading the screw 28 into an opening in the motor frame 11. The spring assembly 24 may be assembled by first threading the springs 32 onto the spring nuts 36, then threading the brackets 33 into the upper ends of the springs 32. The spring assembly 24 is then attached to the unit by bolting the brackets 33 to the end wall of the motor frame.

The motor-compressor unit with the spring assemblies 23 and 24 attached thereto is then inserted into the casing member 19, the motor end being inserted first. As the tension spring 25 is not deflected at this time, it is short enough to be accommodated between the motor frame 11 and the casing member 19. The screw 31 is then inserted through the opening in the dome member 30 and screw threaded into the opening in the bushing 29 until the spring holder 26 is raised to the top of the dome member 30. The bracket 34 is fastened to the brackets 35 by inserting the bolts 37 through openings in the bracket 34 and registering tapped openings in the brackets 35.

The tension spring 25 is now elongated and the compression springs 32 are compressed by the weight of the unit. The unit is resiliently supported, permitting it to move or vibrate relative to the casing. Accordingly, transmission of noise and vibration from the unit to the casing is minimized.

Figures 4, 5:
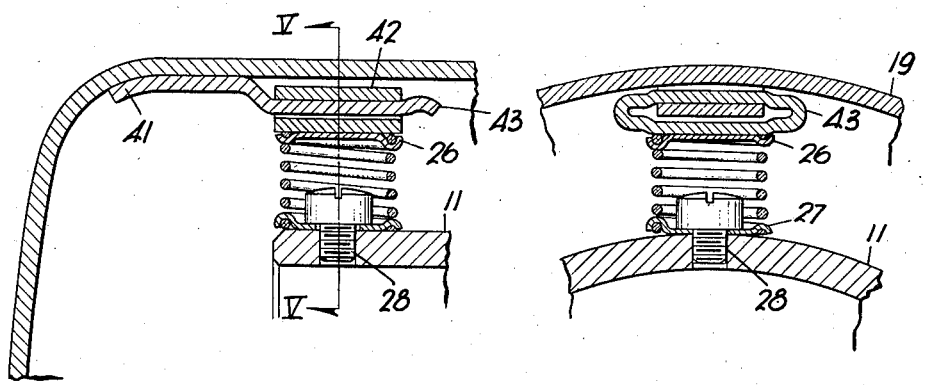
Figs. 4 and 5 are detail sectional views of a modification.

In Figs. 4 and 5, I show a modified construction for attaching the upper end of the tension spring to the casing. This construction comprises a sheet metal bracket 41 spot-welded to the casing member 19 and including a flat portion 42 extending horizontally adjacent but slightly spaced from the top of the casing member. A substantially flat sheet metal sleeve 43 is attached to the spring holder 26, and is formed to receive the flat portion 42 of the bracket 41 upon relative horizontal movement longitudinally of the unit and casing.

The method of assembly of this embodiment is the same as that of the first embodiment except that the spring holder 26 is attached to the casing member by guiding the sleeve 43 to engage the flat bracket portion 42 upon inserting the unit 10 into the casing member.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The combination of a horizontal shaft motor-compressor unit, a fluid-tight casing therefor having a bolt opening therein, a vertical tension spring connected to one end of the unit, a spring holder having a screw-threaded opening therein connected to the upper end of the spring, a bolt extending through said opening in the casing and screw-threaded into said opening in said spring holder, and a spring or springs connected between the other end of said unit and the casing for supporting the unit at said other end.

2. The combination of a horizontal shaft motor-compressor unit, a fluid-tight casing enclosing the same and including a main tubular member having an open end and an end wall closing the other end and further including a closure member for said open end, a spring assembly attached to said motor-compressor unit at the top and the end thereof adjacent said end wall for supporting the unit at said end, said spring assembly consisting of a single vertical tension spring and a spring holder connected to the upper end of said tension spring, means for detachably connecting said spring holder to said main casing member after said motor-compressor unit has been at least partly inserted therein, and a spring or springs connected between the other end of said unit and the casing for supporting the unit at said other end.

3. The combination of a horizontal shaft motor-compressor unit, a fluid-tight casing enclosing the same and including a main tubular member having an open end and an end wall closing the other end and further including a closure member for said open end, a spring assembly attached to said motor-compressor unit at the top and the end thereof adjacent said end wall for supporting the unit at said end, said spring assembly comprising a vertical tension spring and a spring holder connected to the upper end of said tension spring, a bracket attached to the interior of said main casing member adjacent said spring assembly, said spring holder and said bracket being so constructed and arranged as to interengage upon insertion of the motor-compressor unit into said main casing member whereby said end of the motor-compressor unit is supported through said bracket and said spring assembly, and a spring or springs connected between the other end of said unit and the casing for supporting the unit at said other end.

CLIFFORD S. CODY.